(12) United States Patent
Gehlot

(10) Patent No.: US 6,266,171 B1
(45) Date of Patent: Jul. 24, 2001

(54) SYSTEM AND METHOD FOR REDUCTION OF IMPACT FROM UNWANTED SIGNALS IN OPTICAL COMMUNICATIONS SYSTEMS

(75) Inventor: Narayan L. Gehlot, Sayerville, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/197,390

(22) Filed: Nov. 20, 1998

(51) Int. Cl.$^7$ ..................................................... H04B 10/04
(52) U.S. Cl. ........................ 359/181; 359/161; 359/184; 359/185; 359/158
(58) Field of Search .................................... 359/161, 181, 359/184, 185, 158; 375/285, 346, 359, 360

(56) References Cited

U.S. PATENT DOCUMENTS 5,339,183 * 8/1994 Suzuki .................................. 359/123
5,491,576 * 2/1996 Bergano ............................... 359/156
5,724,459 * 3/1998 Banba et al. ............................ 385/3

* cited by examiner

*Primary Examiner*—Leslie Pascal
*Assistant Examiner*—Hanh Phan
(74) *Attorney, Agent, or Firm*—Wolff & Samson

(57) ABSTRACT

A system and method have been described for operating on URZ and $URZ_d$ coded representations of source data, as transmitted via an optical transmission system and received at a receiving location in an optical communications system, to substantially remove the effect of interference from unwanted optical and signal energy in the transmission path. After applying a subtraction operation and complementary mono-shot pulse generators to the resultant difference waveform, regenerated URZ and $URZ_d$ coded representations of the source data are obtained which are substantially free of the effects of such unwanted optical and signal energy in the transmission path. The URZ and $URZ_d$ coded data are then combined in an addition operation to produce a UNRZ coded representation of the source data.

6 Claims, 3 Drawing Sheets

SYSTEM AND METHOD FOR REDUCTION OF IMPACT FROM UNWANTED SIGNALS IN OPTICAL COMMUNICATIONS SYSTEMS

CROSS REFERENCE TO RELATED APPLICATIONS

This application is related to U.S. patent application Ser. No. 09/197,223 entitled "SYSTEM AND METHOD FOR GENERATING NRZ SIGNALS FROM RZ SIGNALS IN COMMUNICATIONS NETWORKS" (GEHLOT-7), said related application being concurrently filed with the present application, having the same inventor, and being incorporated herein by reference.

FIELD OF INVENTION

The present invention relates generally to the field of high speed optical communications and more particularly to a reduction of the effect of signal components extraneous to a data signal transmitted via an optical communications system.

BACKGROUND OF INVENTION

The transmission of information across a communications channel requires that the user (or source) information be converted to the form of a signal which is compatible with transmission characteristics of the communications channel. Such conversion is in many cases accomplished through modulation of an electrical or optical carrier signal, or both, by the information content itself or by compound modulation—that electrical or optical signal being transmitted over the communications channel. In the case of information in digital form, the "1" s and "0" s representing the data are encoded into a form that can be used to drive, or modulate an aspect of the transmission carrier signal, such as amplitude, frequency, phase, or polarization.

Various modulation techniques for digital data are known in the art, including on-off keying (OOK), intensity modulation (IM), amplitude modulation (AM), frequency modulation (FM), phase modulation (PM) and polarization modulation. The source information may be line coded prior to any modulation. The line coded data becomes the baseband signal modulating the electrical or optical channel carrier. Typically, such line codes map the data value "1" to a high signal value defined by the coding format and the value "0" to a low signal value. While, these line coding formats can include negative (less than zero) signal values for the low signal state, such a negative low signal state cannot be realized for optical transmission systems—the concept of "negative" light not being realizable, at least in practice. Accordingly, as the use of optical transmission media has become increasingly the norm, "unipolar" line codes have been developed in which the low signal state is maintained at zero or a small non-zero signal level.

Two line coding methods of particular interest are designated "unipolar return-to-zero" (URZ) and "unipolar non-return-to-zero" (UNRZ) coding formats. URZ and UNRZ coding are types of on-off-keying modulation well known in the communications arts. UNRZ coding is the common coding technique for transmitting data in optical communications systems.

In optical communications systems, the optical carrier signal is normally provided by a laser light source, such as a laser diode or an LED (light emitting diode). The optical output of the laser diode is typically modulated with the UNRZ-coded baseband signal, representing the coded source information, and this modulated light-wave signal will be transmitted across an optical transmission medium, such as a fiber-optic cable or free space. Modulation of the laser output may be either direct, by varying the laser diode current in proportion to the modulating signal, or indirect, through use of an external modulator. At the receiver end of the optical transmission path, an optical demodulator is applied to recover the coded baseband signal, which signal is then decoded to recover the transmitted source information.

In practice, optical communications systems include unwanted signal and/or optical energy which interferes in one way or another with a data signal being transmitted via that optical transmission system. Among the sources of such unwanted signal or optical energy are:

(1) Unwanted background, or residual light, which may be characterized as CDC (continuous DC) light or slow-varying signal energy;

(2) Amplified spontaneous emission (ASE) occurring at optical amplifiers in the transmission path of an optical communications system; and (3) Slow-varying signal energy which is purposely inserted into the optical communications system independently of the data signal transmitted via that system.

The ultimate effect of the unwanted optical and signal energies is to create a bias in the data signal received at a receiving location, which basis may lead to as in the interpretation of information bits transmitted across the optical communications system. It is noted that the impact on data signal recovery from the occurrence of such unwanted optical and signal energies is significantly magnified in optical communications systems using wave division multiplexing (WDM) or dense wave division multiplexing (DWDM)

FIG. 1 provides a graphical illustration of the bias created by each of the identified unwanted optical and signal energies for a received bit or a small number of bits. In particular, the waveform at the left-most portion of the error signal waveform in FIG. 1, identified as DC Light, the bias which might be attributable to CDC light ((1) above) is illustrated. As will be seen in the figure, that bias manifests itself as substantially a constant DC level in the data signal path. In the middle portion of the error waveform, identified as ASE, the bias typically seen as a result of ASE in the optical amplifiers ((2) above) is illustrated. While, as the figure shows, the amplitude of the bias level varies over time, for a given data bit, the amplitude is substantially constant. The bias associated with purposely introduced slow-varying signal energy ((3) above) is illustrated in the right side of the error waveform in FIG. 1 and identified as Low Frequency Added Signal. That bias, as shown in the figure, will typically provide a bias at one level (approximately constant) during the first half of the period of the slowly varying signal, and at a second level during the second half of the period for such a signal. However, because the period of the slowly varying signal is much greater than the period of the data signal, the effect is that of an essentially constant bias over many bits of the data signal.

Although receivers are known in the art which are designed to reduce the error-causing impact of the above-described biases in the received signal, such receivers are not only highly complex, and thus very expensive, they are not fully effective in lighting the areas due to such biases. Accordingly, there is a need in the art for an optical transmission system which provides a consistently high level of error reduction from unwanted optical and signal energy in the transmission path of such a system, and without undue complexity.

SUMMARY OF INVENTION

A system and method are described for providing a reduction of common-mode bias levels in a received optical data signal which may be due to unwanted optical and signal energy in an optical transmission system. In particular, such a reduction is achieved by applying a novel modulation approach for the data signal transmitted via an optical communications system. At the transmitter for the optical transmission system, a URZ coding of the data to be transmitted is applied to modulate an optical carrier signal. At the same time, another URZ coded representation of the data to be transmitted is applied to modulate an optical carrier signal, where the second URZ coded signal is delayed, relative to the first URZ signal, by approximately one-half of the period of the system clock. As the two URZ coded signals traverse an optical transmission path between the transmitter and a receiver, they will be subject to interference from unwanted signal and optical energy in the transmission path. At the receiver, both the URZ coded signal and the delayed URZ (hereafter $URZ_d$) coded signal will be expected to contain approximately the same level of bias from the unwanted signal and optical energy components. Because of the one-half period delay between the URZ coded signal and the $URZ_d$ coded signal, those two signals may be subtracted at the receiver to produce a signal waveform in which substantially all of the common-mode bias terms will have been cancelled out in the subtraction. The difference signal waveform is then operated on by a mono-shot pulse generator in a manner to replicate the transmitted URZ coded signal and the $URZ_d$ coded signal, substantially free of bias levels due to unwanted signal and optical energy. The regenerated URZ and $URZ_d$ coded signals may then be added to produce a UNRZ coded representation of the transmitted data.

DETAILED DESCRIPTION

Figure 1:
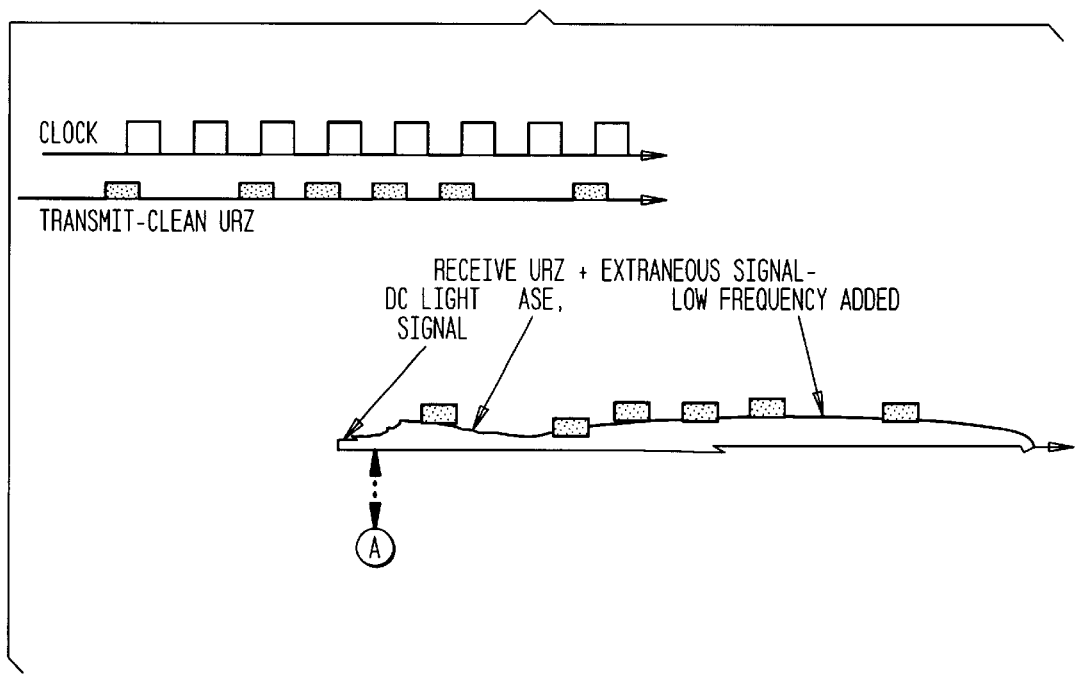
FIG. 1 illustrates biases in a received optical data signal which typically result from various unwanted optical and signal energies in an optical transmission path.

The invention is an apparatus and method for use with a high speed optical transmission system to reduce error in data transmitted via such a system which is typically due to unwanted optical and signal energy in such a system. In order to achieve that result, the invention takes advantage of a unique hybrid coding methodology developed by the inventor which enables two occurrences of identical URZ-coded data to be transmitted (one occurrence being delayed by given amount) and the two transmissions being later combined to produce UNRZ coded data. As is explained more fully in co-pending U.S. patent application Ser. No. 09/197,223, entitled SYSTEM AND METHOD FOR GENERATING NRZ SIGNALS FROM RZ SIGNALS IN COMMUNICATIONS NETWORKS (GEHLOT-7), which is incorporated herein by reference. This hybrid coding methodology has significant advantages over the prior art in that it is an efficient way to receive UNRZ coded data by transmitting URZ coded data. This is significant in the URZ coded data has properties that favor optical transmission while UNRZ coding provides advantages from an overall system point.

As taught by the companion cross-referenced application, the provision of such a hybrid coding methodology, combining features of UNRZ coding and URZ coding, achieves many of the advantages of both, while largely avoiding the disadvantages associated with those coding methodologies. As is also taught by the companion cross-referenced application, a single facet of the new coding methodology lies in the inventor's recognition that a UNRZ coded signal for a given data stream is equivalent to a sum of two URZ coded signals for that data stream, where the second of those URZ coded signals ($URZ_d$) is delayed relative to the first URZ coded signal by one-half of a clock interval.

According to the method of the invention, a URZ coded representation of data to be transmitted, along with a $URZ_d$ coded representation of that data, are generated at a transmitter and used to modulate optical carrier signals transmitted via an optical transmission system. In the course of transmission of data from the transmitter to a receiving location in an optical communications system, both the URZ coded signal and the $URZ_d$ coded signal will be expected to incur substantially comparable interference from the previously-described unwanted optical and signal energy components. Accordingly, both the URZ signal and $URZ_d$ signal, as received at a receiving location, will be expected to include some level of bias from the interfering unwanted optical and signal energy components; for a given data bit, each signal should experience substantially the same bias level.

Because a given data pulse encoded with the $URZ_d$ coding is displaced, relative to the URZ coding of that same data pulse, by one-half of the clock period (according to the methodology of the companion cross-referenced application designated GEHLOT-7), the $URZ_d$ coded signal may be subtracted from the URZ coded signal to produce a new signal waveform which will have a well-established relationship to the transmitted data. Specifically, the composite signal waveform resulting from such a subtraction operation can be seen as a composite of the URZ coded signal and the complement of the $URZ_d$ coded signal. However, because the bias level in the received data signals is present at substantially the same amplitude throughout a clock interval for a given data bit, the subtraction process has the effect of substantially cancelling that bias level—i.e., the bias levels for the URZ coded data stream and for the $URZ_d$ coded data stream being substantially equivalent, subtraction of one from the other leaves a net bias level of approximately zero.

Although the cleaned-up composite signal derived from the subtraction operation can be related to the transmitted data, it is not in a form which can be regularly utilized by other data processing operations. Ultimately, it is desired that the received signal be provided in a UNRZ coded representation of the transmitted data. To achieve that result, the following additional steps are required. The composite signal resulting from the subtraction operation is applied to each of two pulse generation means, such as a mono-shot generator, which operate to generate a pulse having a duration of one-half of the clock period at the leading edge of each positive- or negative-going pulse, respectively, in the composite signal. The output of the pulse generator operating on positive-going pulses in the composite signal will be a waveform which is equivalent to a URZ coded representation of the transmitted data. At the same time, the output of the pulse generator operating on the leading edge of negative-going pulses in the composite signal will be a waveform which is equivalent to the $URZ_d$ coded representation of the transmitted data—i.e., positive waveform amplitude and a pulse width corresponding to URZ pulse for a given data bit, but delayed by one-half of the clock interval relative to the URZ pulse.

These regenerated, and substantially bias free, URZ and $URZ_d$ coded representations of the transmitted data are then added together. The resultant waveform, as taught by the method of the companion cross-referenced application designated GEHLOT-7, is equivalent to a UNRZ coding of the transmitted data. Thus, the method of the invention operates to provide, at the receiver, a UNRZ coded representation of the transmitted data which is substantially free of bias levels attributable to unwanted optical and signal energy in the transmission path.

Figure 2A:
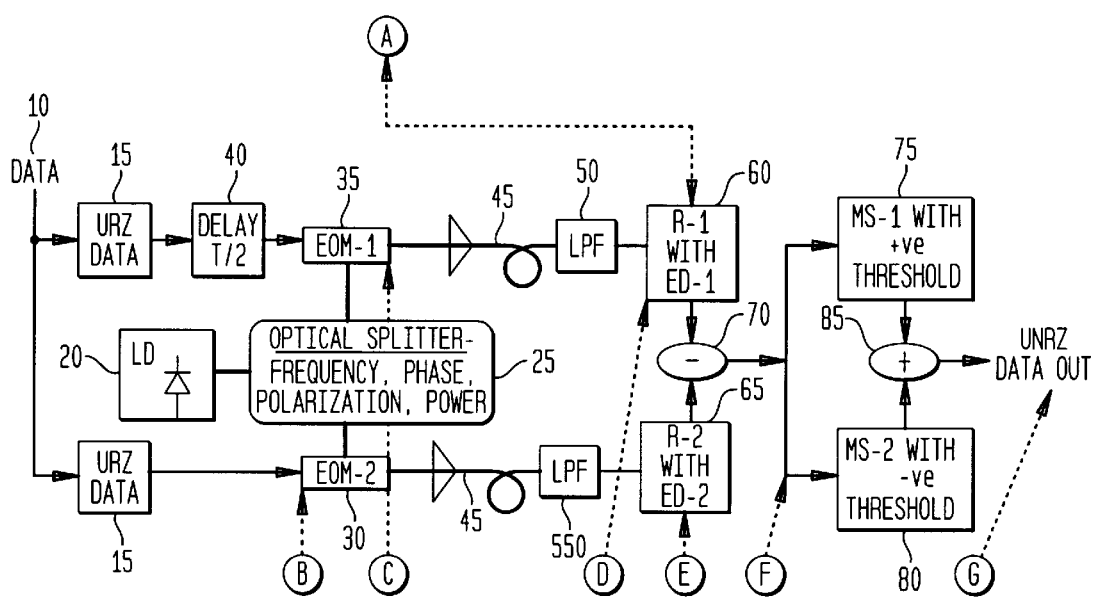
FIG. 2A illustrates an embodiment for carrying out the method of the invention.
Figure 2B:
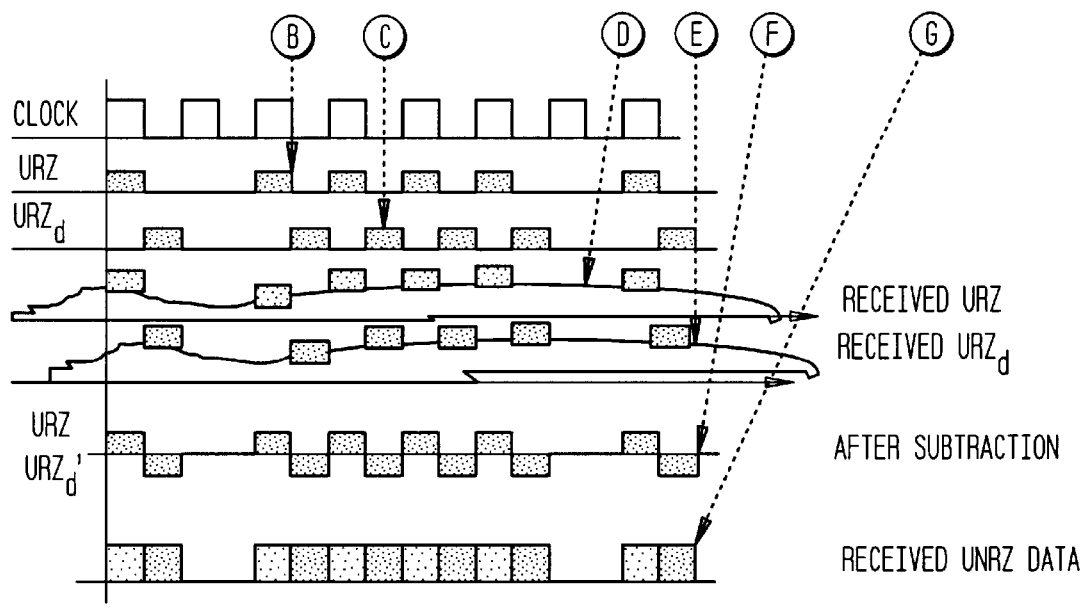
FIG. 2B illustrates, via timing diagrams, illustrative signal waveform for different stages of the embodiment of the invention shown in FIG. 2A.

FIG. 2A provides a schematic illustration of a preferred embodiment for carrying out the method of the invention. In FIG. 2B, which should be viewed in conjunction with FIG. 2A, illustrative signal waveform are shown corresponding to an operation of various stages of the embodiment of FIG. 2A. Note initially that the waveforms shown in FIG. 2B are based on an illustrative data stream used here to describe the operation of the invention, having the bits "1, 0, 1, 1, 1, 1, 0, 1".

With reference now to FIG. 2A, the signal data is provided from Information Source 10 to dual URZ Coders 15, which provide as an output a URZ coded representation of the input data. A Laser Transmitter 20 generates a lightwave signal which is provided as an input to Beam Splitter 25, that beam splitter being operative to provide two optical carrier signals at its output. An External Optical Modulator (EOM-2) 30, which is driven by an input signal from URZ Coder 15, is applied to modulate one of the optical carrier signals that is output from the Optical Splitter, and another External Optical Modulator (EOM-2) 35 is applied to the other optical carrier signal output from the Optical Splitter.

Modulator 35 is driven by an output signal from Delay 40, that Delay operating to introduce a delay of approximately one-half of a clock period for the URZ-coded date signal provided by URZ Coder 15. Thus the output of Delay 40 and correspondingly the input to Modulator 35 is a $URZ_d$ coded data signal, which, for a given data bit is identical to the URZ coding for that data bit, but delayed, relative to the URZ coding for that data bit, by approximately one-half of a clock period. In FIG. 2B, the waveform for the URZ coded representation of the illustrative data pattern is shown at the row designated "URZ," and the waveform for the $URZ_d$ coded representation of that data pattern is shown at the row designated "$URZ_d$."

After transmission across an optical transmission path 45, the URZ and $URZ_d$ coded data are recovered by an appropriate demodulation operation, at which point each such data signal will contain various extraneous signal components introduced by the transmission medium, the modulation operation and optical amplifiers in the transmission path. The received URZ and $URZ_d$ data signal are low pass filtered by the LPF 50 and LPF 55 filters, respectively, to remove low level frequency components of such extraneous signal elements. At that point, the URZ and the $URZ_d$ signals, $R_1$ 60 and $R_2$ 65, will each include a bias signal level attributable to unwanted optical and signal energy from the transmission path. Illustrative waveforms for the received URZ and $URZ_d$ signals, with the included biases, are shown in FIG. 2B at the rows designated "Received URZ" and "Received $URZ_d$," respectively. As can be seen in the figure, for a given data bit, that bias level for each signal path will be substantially the same and substantially uniform during the period of the clock interval for that bit.

Those received URZ and $URZ_d$ data signals are then operated on by Subtractor 70, which subtracts the $URZ_d$ coded signal from the URZ coded signal. The output of that subtraction operation for the illustrative data sequence of FIG. 2B is shown in the row of that figure designated "After Subtraction." As can be seen in the figure, that resultant signal pattern includes both positive and negative pulses. It can further be seen from FIG. 2B that the pulses ("1s" and "0s") above the horizontal axis in the composite "After Subtraction" signal correspond to the pulses of the URZ coded signal, as indicated by "URZ" to the left of, and above the horizontal axis for that waveform. Similarly, it will be seen that the negative pulses of the composite signal represent the complement of the pulses for the $URZ_d$ coded signal, as indicated by "$URZ_d$" to the left of, and below the horizontal axis for that waveform. Thus, the composite signal can be seen to be related to the waveform of the underlying data signal and substantially free of bias levels due to unwanted optical and signal energy.

In order to transform the composite After Subtraction signal to the desired UNRZ coded representation of the transmitted data, that composite signal is applied as an input to two mono-shot pulse generators, MS-1 75 and MS-2 80. Those mono-shot pulse generators operate, in a well known manner, on the leading edge of each positive and each negative pulse in the composite signal to generate, in each case, a positive pulse of a desired amplitude and having a pulse width equal to one-half of the clock period It will be appreciated from the relationship of positive and negative pulses in the composite signal, that the positive pulse generated by the mono-shot function for each negative pulse in the composite signal will be delayed by one-half of the clock period relative to the pulse generated for the next preceding positive pulse in the composite signal. It should therefore be apparent that the resultant wave form at the output of the M1 mono-shot pulse generator on the composite signal corresponds to the URZ coding (row "URZ") for the illustrative data sequence, and that the waveform for the output of the M2 mono-shot pulse generator corresponds to the $URZ_d$ coding (row "$URZ_d$") for that data. These regenerated URZ and $URZ_d$ coded signal may then be combined, according to the method of the companion cross-referenced application designated GEHLOT-7, by Adder 85 to provide a UNRZ coded representation of the transmitted data, as shown in FIG. 2B in the final row of the figure.

CONCLUSION

A system and method have been described for operating on URZ and $URZ_d$ coded representations of source data, as transmitted via an optical transmission system and received at a receiving location in an optical communications system, to substantially remove the effect of interference from unwanted optical and signal energy in the transmission path. After applying a subtraction operation and complementary mono-shot pulse generators to the resultant difference waveform, regenerated URZ and $URZ_d$ coded representations of the source data are obtained which are substantially free of the effects of such unwanted optical and signal energy in the transmission path. The URZ and $URZ_d$ coded data are then combined in an addition operation to produce a UNRZ coded representation of the source data.

Although the methodology of the invention, and illustrative applications of that methodology, have been described in detail, it should be understood that various changes, alterations, and substitutions can be made therein without departing from the spirit and scope of the invention as defined by the appended claims. In particular, it should be understood that the disclosed methodology of the invention may also be applied for dispersion compensation (i.e., chromatic, material and polarization dispersion) according to methods taught in companion cross-referenced applications designated GEHLOT-5, GEHLOT-6 and GEHLOT-12.

What is claimed is:

1. A method for reducing interference effects from unwanted optical and signal energy components in an optical transmission system comprising the steps of:

providing a first URZ coded representation of data to be transmitted via said optical transmission system and applying said first URZ-coded data to modulate an optical carrier signal transmitted via said optical transmission system;

providing a second URZ coded representation of said data to be transmitted and applying said second URZ coded data to modulate an optical carrier signal, wherein said second URZ coded data is delayed relative to said first URZ coded data by a predetermined amount;

at a receiving location for said optical transmission system, recovering said transmitted first URZ and said second URZ coded data signals;

subtracting said received second URZ modulated signal from said received first URZ modulated signal to produce a difference signal;

operating on said difference signal to regenerate said first URZ and said second URZ coded representations of said data to be transmitted, said regenerated first URZ and second URZ coded data being substantially free of interference effects from said unwanted optical and signal energy components; and summing said regenerated first URZ and second URZ coded signals.

2. The method of claim 1 wherein said delay for said second URZ coded data is determined to cause said second URZ coded data to be delayed by approximately one-half of a clock interval upon receipt of said data at a receiving location.

3. The method of claim 1 wherein said step of regenerating said URZ and URZ$_d$ coded representations of said data to be transmitted includes the substeps of:

operating on said difference signal with a first pulse generator operative to produce a first regenerated signal waveform having positive pulses corresponding to positive pulses in said difference signal, said first regenerated signal waveform corresponding to said first URZ coding of said data to be transmitted;

operating on said difference signal with a second pulse generator operative to produce a second regenerated signal waveform having positive pulses corresponding to negative pulses in said difference signal, said second regenerated signal waveform corresponding to said second URZ coding of said data to be transmitted.

4. A system for reducing interference effects from unwanted optical and signal energy components in an optical transmission system comprising:

coding means for providing a first URZ coded representation of data to be transmitted via said optical transmission system;

modulating means operative to apply said first URZ-coded data to modulate an optical carrier signal transmitted via said optical transmission system;

means for providing a second URZ coded representation of said data to be transmitted, wherein said second URZ coded data is delayed relative to said first URZ coded data by a predetermined amount;

modulation means operable to apply said second URZ coded data to modulate an optical carrier signal;

a transmitter operable to cause said first and said second URZ modulated signals to be transmitted in said optical transmission system;

a receiver linked to said optical transmission system operable to recover said transmitted first URZ and said second URZ coded data signals;

subtractor means for subtracting said received second URZ modulated signal from said received first URZ modulated signal to produce a difference signal;

waveform regeneration means for operating on said difference signal to regenerate said first URZ and said second URZ coded representations of said data to be transmitted, said regenerated first URZ and second URZ coded data being substantially free of interference effects from said unwanted optical and signal energy components; and means for summing said regenerated first URZ and second URZ coded signals.

5. The system of claim 4 wherein said delay for said second URZ coded data is determined to cause said second URZ coded data to be delayed by approximately one-half of a clock interval upon receipt of said data at said receiver.

6. The system of claim 4 wherein operation of said waveform regeneration means further includes:

operating on said difference signal with a first pulse generator operative to produce a first regenerated signal waveform having positive pulses corresponding to positive pulses in said difference signal, said first regenerated signal waveform corresponding to said first URZ coding of said data to be transmitted; and operating on said difference signal with a second pulse generator operative to produce a second regenerated signal waveform having positive pulses corresponding to negative pulses in said difference signal, said second regenerated signal waveform corresponding to said second URZ coding of said data to be transmitted.

* * * * *